United States Patent
Kim

(10) Patent No.: US 7,267,907 B2
(45) Date of Patent: Sep. 11, 2007

(54) NEGATIVE ELECTRODE FOR RECHARGEABLE LITHIUM BATTERY AND RECHARGEABLE LITHIUM BATTERY COMPRISING SAME

(75) Inventor: Deok-Geun Kim, Suwon-si (KR)

(73) Assignee: Samsung SDI Co., Ltd, Suwon-si (KR)

( * ) Notice: Subject to any disclaimer, the term of this patent is extended or adjusted under 35 U.S.C. 154(b) by 0 days.

(21) Appl. No.: 10/996,938

(22) Filed: Nov. 22, 2004

(65) Prior Publication Data

US 2005/0238958 A1    Oct. 27, 2005

(30) Foreign Application Priority Data

Nov. 27, 2003   (KR) ................ 10-2003-0085073

(51) Int. Cl.
   H01M 4/62   (2006.01)
   H01M 4/58   (2006.01)
   H01M 4/40   (2006.01)

(52) U.S. Cl. ............. 429/217; 429/209; 429/231.4; 429/231.95

(58) Field of Classification Search ............ None
   See application file for complete search history.

(56) References Cited

U.S. PATENT DOCUMENTS

| | | | |
|---|---|---|---|
| 5,780,184 A * | 7/1998 | Coco et al. | 429/217 |
| 2002/0127471 A1 * | 9/2002 | Siret et al. | 429/217 |
| 2004/0096741 A1 | 5/2004 | Goto et al. | |
| 2005/0074669 A1 * | 4/2005 | Park et al. | 429/217 |
| 2005/0074670 A1 * | 4/2005 | Azuma | 429/231.8 |

FOREIGN PATENT DOCUMENTS

| | | | |
|---|---|---|---|
| JP | 50045925 | * | 4/1975 |
| JP | 5-101829 | | 4/1993 |
| JP | 10-208731 | | 8/1998 |
| JP | 11-288718 | | 10/1999 |
| JP | 2000-100437 | | 4/2000 |
| JP | 2001-23642 | | 1/2001 |
| JP | 2005-5113 | | 1/2005 |
| KR | 2000-0071133 | | 11/2000 |

OTHER PUBLICATIONS

Patent Abstracts of Japan for Publication No.: 2000-100437, Date of publication of application Apr. 7, 2000, in the name of Hiroshi Ogawa et al.

Patent Abstracts of Japan, Publication No. 2001-023642, dated Jan. 26, 2001, in the name of Masanori Ito et al.

(Continued)

Primary Examiner—John S. Maples
(74) Attorney, Agent, or Firm—Christie, Parker & Hale, LLP

(57) ABSTRACT

The present invention relates to an electrode for a rechargeable lithium battery comprising an emulsion binder, and a lithium secondary battery including the same. The electrode comprises a current collector coated with an active material layer including active material powders and a cellulose-based polymer binder having an esterification degree greater than or equal to 1.3 and a weight average molecular weight greater than or equal to 100,000. Batteries including electrodes with an active material that includes such a cellulose-based polymer exhibit improved energy density and high reversible capacity.

23 Claims, 1 Drawing Sheet

OTHER PUBLICATIONS

Patent Abstracts of Japan, Publication No. 05-101829, dated Apr. 23, 1993, in the name of Yuji Mochizuki et al.
Patent Abstracts of Japan, Publication No. 10-208731, dated Aug. 7, 1999, in the name of Nobuaki Suzuki et al.
Patent Abstracts of Japan, Publication No. 11-288718, dated Oct. 19, 1999, in the name of Yoshitsugu Kojima et al.
Patent Abstracts of Japan, Publication No. 2005-005113, dated Jan. 6, 2005, in the name of Hideki Kaido et al.

* cited by examiner

NEGATIVE ELECTRODE FOR RECHARGEABLE LITHIUM BATTERY AND RECHARGEABLE LITHIUM BATTERY COMPRISING SAME

CROSS REFERENCE TO RELATED APPLICATION

This application claims priority to and the benefit of Korean Application No. 10-2003-0085073 filed in the Korean Patent Office on Nov. 27, 2003, the entire content of which is incorporated hereinto by reference.

FIELD OF THE INVENTION

The present invention relates to an electrode for a rechargeable lithium battery, and a lithium secondary battery including the same, and more particularly, to an electrode for a rechargeable lithium battery having good energy density, good reversible capacity and good adhesion force. It further relates to a lithium secondary battery including the improved electrode.

BACKGROUND OF THE INVENTION

Recently, carbonaceous materials that do not generate lithium dendrites have been introduced for use in place of lithium metal as the negative active material for rechargeable lithium batteries. A negative electrode is produced by mixing a negative active material and a binder, and optionally a conductive material in an organic solvent to prepare a negative active material composition, and coating the composition on a current collector followed by drying.

The binder provides adhesion between the current collector and active material powders and adhesion among the active material powders when coating the active material on the current collector. In addition to good adhesion properties, desired features for the binder include good electrochemical stability, non-flammability, electrolyte-wettability, low electrode expandability, and high dispersion and crystallization degrees.

Polyvinylidene fluoride is generally used as a binder. However, polyvinylidene fluoride is a fiber which tends to cover the negative active material making it difficult for the active material to effectively perform its function. Furthermore, polyvinylidene fluoride binder has somewhat insufficient adhesion, which results in the separation of the negative active material from the current collector as charge and discharge cycles are repeated, thereby decreasing capacity and deteriorating the cycle life characteristics.

Furthermore, N-methyl-2-pyrrolidone organic solvent, which is a good solvent for polyvinylidene fluoride, tends to generate a vapor that can cause safety problems.

A binder that is suitable for an active material developed for high performance is desired. A carbonaceous material as a negative material is a chemically inactive material, but the structure and surface properties (hydrophobic or hydrophilic) of the negative material vary depending on the kind of active material and thus satisfactory adhesion is difficult to obtain. In particular, a natural graphite-based active material has a flat shape and thus its tap density and appearance density are very low resulting in deterioration of adhesion when a PVdF binder is used in a conventional amount.

Investigation into the use of styrene butadiene rubber (SBR) and polytetrafluoroethylene as binders have been undertaken. Such materials do not cause the negative active material to be covered, and they can be used in aqueous solutions such that solvent removal is not necessary. However, these materials exhibit poor adhesion compared to polyvinylidene fluoride, and do not exhibit good cycle life characteristics. In addition, SBR exhibits high expandability and tends to agglomerate in a slurry resulting in poor dispersion.

SUMMARY OF THE INVENTION

In one embodiment of the present invention an electrode for a lithium secondary battery is provided with superior adhesion to the negative active material and improved energy density and reversible capacity.

In another embodiment of the invention a lithium secondary battery is provided which exhibits good energy density and reversible capacity.

In still another embodiment of the invention, an electrode for a lithium secondary battery includes a current collector, and an active material layer formed on the current collector. The active material layer includes an active material, an esterified cellulose-based polymer binder having an esterification degree of more than or equal to 1.3 and a molecular weight of more than or equal to 100,000.

In yet another embodiment of the invention, a lithium secondary battery is provided that includes the inventive electrode.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION

Figure 1:
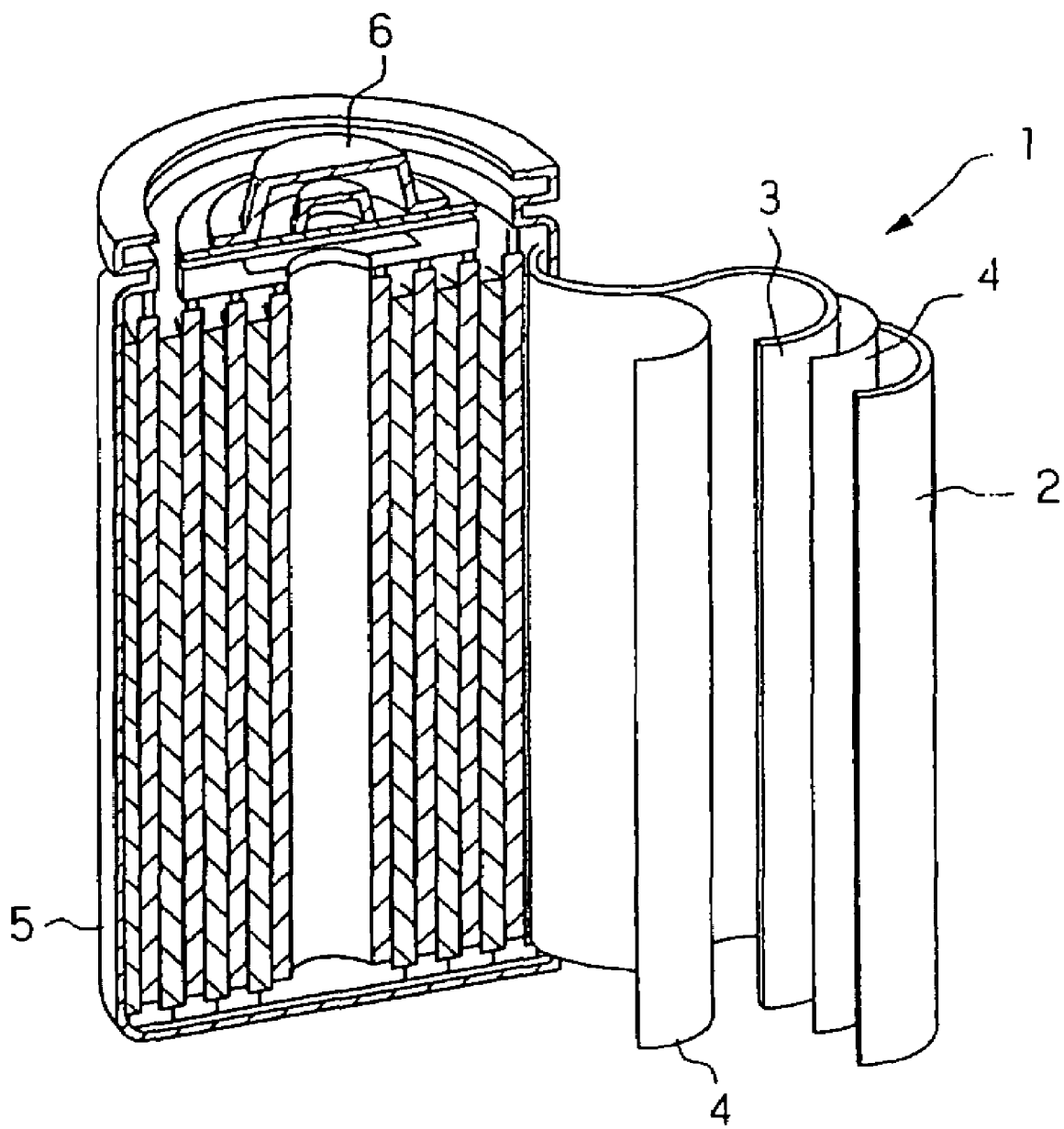
FIG. 1 is an exploded perspective view showing an embodiment of a structure of a rechargeable lithium battery of the present invention.

In one embodiment of the present invention, in order to achieve good adhesion of the electrode for a rechargeable lithium battery, an esterified cellulose-based polymer having an esterification degree of more than or equal to 1.3 and a molecular weight of more than or equal to 100,000 is used as a binder material.

According to one embodiment of the present invention, an electrode comprises an active material layer including active material powders and an esterified cellulose-based polymer binder having an esterification degree of more than or equal to 1.3 and molecular weight of more than or equal to 100,000.

In one embodiment, the esterified cellulose-based polymer binder has an esterification degree of more than or equal to 1.3 and preferably 1.5 to 3.0. If the esterification degree of the esterified cellulose-based polymer binder increases, oil-affinity of the polymer increases and thus adhesion force between the polymer and active material increases. The binder is mixed with the active material in water to prepare a slurry and then the slurry is coated on a current collector to form an active material layer. As the esterification degree increases, the ionization degree in the water increases, which encourages the formation of networks and makes dispersion and coating of the active material powders uniform.

In one embodiment of the invention, the esterified cellulose-based polymer binder has a molecular weight of more than or equal to 100,000, preferably from 100,000 to 300,000. The molecular weight of the polymer depends on its chain length. If the molecular weight is less than 100,000, the attraction among the polymers decreases and uniform dispersion of the active material is not obtained.

Examples of the esterified cellulose-based polymer include carboxyl methylcellulose (CMC), methyl cellulose, ethyl cellulose, hydroxypropylmethyl cellulose, hydroxypropylethyl cellulose, and the like. CMC is preferable because its solubility and ionization in water are good, its viscosity-increasing properties are high and its coating properties are good. Its good adhesion prevents detachment of the active materials from a current collector which results in good cycle life characteristics.

In one embodiment of the invention, the amount of the esterified cellulose-based binder is less than or equal to 2% by weight, is preferably from 0.01 to 2.0% by weight, and is more preferably from 0.5 to 2.0% by weight based on the total weight of the active material layer. If the amount of the binder is more than 2% by weight, viscosity increases, making the coating of the negative active material on a current collector difficult.

The negative active material and the current collector include any materials which are conventionally used, and are not limited to the examples set forth herein.

The negative active material may include a material that is capable of reversible intercalation/deintercalation of the lithium ions. Examples of negative active material are carbonaceous materials such as artificial graphite, natural graphite, graphitized carbon fiber, graphitized mesocarbon microbeads, fullerene, and amorphous carbon. In one embodiment, the carbonaceous material has a d002 interplanar distance of 3.35-3.38 Å, an Lc (crystallite size) measured by X-ray diffraction of more than 20 nm, and an exothermic peak of at least 700° C.

The negative active material may also include a metal which is capable of alloying with lithium, and a mixed material of the carbonaceous material and the metal. Examples of metals which are capable of alloying with lithium include Al, Si, Sn, Pb, Zn, Bi, In, Mg, Ga, Cd, Ge, and similar metals. The current collector may also include a punching metal, an exmet punching metal, a metal foil, a foamed metal, a mesh metal-fiber calcinated body or the like. Examples of metal foils include nickel foil and copper foil.

The negative electrode may also comprise a conductive agent. Examples of conductive agents include nickel powder, cobalt oxide, titanium oxide, and carbon. Examples of suitable carbon materials include ketjen black, acetylene black, furnace black, denka black, graphite, carbon fiber, fullerene, and similar materials.

In one embodiment, a rechargeable lithium battery includes the negative electrode described above. The negative electrode exhibits good adhesion between the active materials and the current collector and among the active material powders, and prevents the detachment of the active materials from the electrode even where there is a change in volume of the active material powders during charging and discharging. This results in improved cycle life characteristics. Because the binder is a non-conductive material and less binder is used according to the present invention, electrode impedance can also be reduced resulting in improved current characteristics at a high rate.

The negative electrode of the present invention is fabricated by dispersing active material powders, a cellulose-based binder, a water-soluble polymer, and a water-soluble polymer in water to prepare a slurry. The slurry is coated on a current collector and then dried and compressed. The shape of the negative electrode is generally a sheet, but may also be cylindrical, disk-shaped, flat, or rod shaped. In one embodiment, the electrode is fabricated by immersing a current collector in a slurry as set forth above and then drying it.

In one embodiment of the present invention, the aqueous binder dispersed in the aqueous dispersion does not require special facilities as are required for treatment of organic solvents as are used with conventional binders. This results in cost reductions and reduces the possibility of environment contamination.

In another embodiment of the present invention, a rechargeable lithium battery is provided including the negative electrode. The rechargeable lithium battery includes a positive electrode, a negative electrode, and an electrolyte, and optionally a separator.

In general, any positive electrode may be used. For example, the positive electrode can be fabricated by mixing a positive active material powder, polyvinylidene fluoride as a binder, and carbon black as a conductive agent to obtain a paste. The paste is coated and formed into a shape such as a flat sheet.

Examples of positive active material include $LiMn_2O_4$, $LiCoO_2$, $LiNiO_2$, $LiFeO_2$, $V_2O_5$, and similar materials. An active material capable of intercalating/deintercalating lithium ions, such as TiS, MoS, organic disulfide, organic polysulfide of similar materials may be used. As the conductive agent, ketjen black, acetylene black, furnace black, denka black, graphite, carbon fiber, or fullerene can be used. As the binder, it is possible to use a water-soluble polymer such as carboxymethylcellulose methylcellulose or sodium polyacrylate, as well as polyvinylidene fluoride.

A positive electrode is fabricated by mixing a positive active material, a binder, and a conductive agent, then coating the mixture on a current collector such as a metal foil or metal net, drying it, and compressing it into a sheet shape.

A separator may be made from any material which is generally used for separators for rechargeable lithium batteries. For example, the separator may be made from polyethylene, polypropylene, polyvinylidene fluoride, polyamide, glass fiber or similar materials, or a multilayered structure may be used.

A non-aqueous electrolyte of the present invention may further include a non-aqueous organic solvent and a lithium salt.

Examples of the non-aqueous organic solvent include propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethylacetoamide, dimethylsulfoxide, dioxan, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylbutyl carbonate, dipropyl carbonate, diisopropyl carbonate, dibutylcarbonate, diethyleneglycol, dimethylether, and mixtures thereof, but are not limited thereto. Any solvent which has been used for a rechargeable lithium battery can be made available. In one particular embodiment, a mixture of at least one of propylene carbonate, ethylene carbonate, and butylene carbonate and at least one of dimethyl carbonate, methylethyl carbonate, and diethylcarbonate are preferred.

The lithium salt may be at least one salt selected from $LiPF_6$, $LiBF_4$, $LiAsF_6$, $LiCF_3SO_3$, $LiN(CF_3SO_2)_3$, $Li(CF_3SO_2)_2N$, $LiC_4F_9SO_3$, $LiClO_4$, $CF_3SO_3Li$, $LiN(SO_2C_2F_5)_2$, $LiSbF_6$, $LiAlO_4$, $LiAlCl_4$, $LiN(C_xF_{2x+1}SO_2)$ ($C_xF_{2y+1}SO_2$) (where x and y are natural numbers), LiCl, or LiI. Preferred salts are $LiPF_6$, LiBF4, or mixtures thereof.

The concentration of the lithium salt preferably ranges from 0.6 to 2.0 M, and more preferably from 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity. The lithium salt of a battery provides a source of lithium ions, making the basic operation of a lithium secondary battery possible.

The electrolyte may also be a polymer electrolyte which comprises a polymer having good expandability with respect to an electrolyte solution. Examples include polyethylene oxide, polypropylene oxide, polyacetonitrile, polyvinylidene fluoride, polymethacrylate, polymethylmethacrylate, and similar polymers.

A rechargeable lithium battery of the present invention is generally fabricated by putting a positive electrode, a negative electrode, an electrolyte, and optionally, a separator, into a case, and sealing it. As shown in FIG. 1, a cylindrical rechargeable lithium battery includes a negative electrode 2 according to the present invention, a sheet type positive electrode 3, a separator 4 interposed between the negative electrode 2 and the positive electrode 3, electrolyte into which the negative electrode 2, the positive electrode 3 and the separator 4 are immersed, a cylindrical battery case 5, and a sealing member 6 for sealing the battery case 5. The rechargeable lithium battery 1 is manufactured by spirally winding the negative electrode 2, the positive electrode 3, and the separator 4 to produce an electrode element, and inserting the electrode element into the battery case 5.

The rechargeable lithium battery including the negative electrode comprising the aforementioned structure has good cycle life characteristics due to the good attachment between the current collector and the active material powders during charge and discharge.

The present invention is further explained in more detail with reference to the following examples. These examples, however, should not be interpreted as limiting the scope of the present invention in any manner.

EXAMPLE 1

After mixing 97 parts by weight of natural graphite as a negative active material with 1.5 parts by weight of esterfied carboxyl methylcellulose (CMC) having an esterification degree of 1.3 and a molecular weight of 220,000, a negative slurry was prepared by dispersing the mixture in 56 parts by weight of pure water. The slurry was coated on copper foil, dried, and compressed with a roll press, thereby manufacturing a negative electrode with an active mass density of 1.5 g/cc.

After mixing 96 parts by weight of LiCoO2 as a positive active material, 2 parts by weight of polyvinylidenefluoride (PVdF) as a binder, and 2 parts by weight of Super-P as a conductive agent, a positive slurry was prepared by dispersing the mixture into 100 parts by weight of N-methyl-2-pyrrolidone. The slurry was coated on aluminum foil, dried, and compressed with a roll press, thereby manufacturing a positive electrode with an active mass density of 3.5 g/cc.

Together with a polyethylene separator, the manufactured negative and positive electrodes were wound and pressed, then placed into a battery case, and electrolyte including 1.0M LiPF6 dissolved in a mixed solvent of ethylene carbonate/dimethyl carbonate/ethylmethyl carbonate (in a volume ratio of 3/3/4) was added thereto, thereby completing the manufacture of the battery cell.

EXAMPLE 2

A lithium battery cell was manufactured in the same manner as in Example 1, except that esterified carboxyl methylcellulose (CMC) having an esterification degree of 1.5 and a molecular weight of 220,000 was used.

EXAMPLE 3

A lithium battery cell was manufactured in the same manner as in Example 1, except that esterified carboxyl methylcellulose (CMC) having an esterification degree of 2.5 and a molecular weight of 220,000 was used.

COMPARATIVE EXAMPLE 1

A lithium battery cell was manufactured in the same manner as in Example 1, except that esterified carboxyl methylcellulose (CMC) having an esterification degree of 0.75 and a molecular weight of 185,000 was used.

COMPARATIVE EXAMPLE 2

A lithium battery cell was manufactured in the same manner as in Example 1, except that esterified carboxyl methylcellulose (CMC) having an esterification degree of 0.75 and a molecular weight of 50,000 was used.

The reversible capacities of Example 2 and Comparative Example 1 were measured using TOYO charge-discharge equipment. The battery cells were charged at 800 mA, 4.2V under constant current and constant voltage for 2.5 hours, and then discharged at 800 mA to the cut-off voltage of 2.75V under a constant current. The reversible capacities of Examples 2 and 3 were 92% and 95%, respectively whereas that of Comparative Example 1 was 89%.

In order to evaluate the adhesion between the active mass and metal foil for Example 2 and Comparative Example 2 the peel strengths were measured. Pieces of double-faced SCOTCH brand tape (3M Company) measuring 1.5×1.5 cm were attached on glass plates and the negative electrodes were attached thereon. The force of detaching the tape from the negative electrode at room temperature at an angle of 180 degrees and at a speed of 0.5 cm/sec was measured using a tension strength tester manufactured by Hounsfield company. The peel strengths for Examples 1 and 3 were 0.6 gf/mm and 0.5 gf/mm respectively and that of Comparative Example 2 was 0.2 gf/mm.

As shown by the examples, the use of a cellulose-based polymer binder having a predetermined esterification degree and weight average molecular weight improves energy density and provides high reversible capacity and increased peel strength.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrode for a rechargeable lithium battery, comprising:
   a current collector; and
   an active material layer coating the current collector, the active material layer comprising active material and an esterified cellulose-based polymer binder having an esterification degree greater than or equal to 1.3 and a molecular weight greater than or equal to 100,000.

2. The electrode of claim 1, wherein the esterified cellulose-based polymer binder is formed from a cellulose compound selected from the group consisting of carboxylmethylcellulose (CMC), methyl cellulose, ethyl cellulose, hydroxypropylmethyl cellulose, hydroxypropylethyl cellulose, and combinations thereof.

3. The electrode of claim 1, wherein the esterified cellulose-based polymer binder is provided in an amount less than or equal to 2% by weight based on total amount of the active material layer.

4. The electrode of claim 1, wherein the esterification degree of the esterified cellulose-based polymer binder is between 1.5 and 3.0.

5. The electrode of claim 1, wherein the molecular weight of the estenfied cellulose-based polymer binder is between 100,000 and 300,000.

6. The electrode of claim 1, wherein the active material is selected from the group consisting of materials capable of reversible intercalation/deintercalation of lithium ions, metals capable of alloying with lithium, and combinations thereof.

7. The electrode of claim 6, wherein the active material is a material capable of reversible intercalation/deintercalation of lithium ions selected from the group consisting of artificial graphite, natural graphite, graphitized carbon fiber, graphitized mesocarbon microbeads, fullerene, amorphous carbon, and combinations thereof.

8. The electrode of claim 6, wherein the active material is a metal capable of alloying with lithium selected from the group consisting of Al, Si, Sn, Pb, Zn, Bi, In, Mg, Ga, Cd, Ge and combinations thereof.

9. The electrode of claim 1, wherein the current collector is selected from the group consisting of punching metals, exmet punching metals, metal foils, foamed metals, and mesh metal-fiber calcinated bodies.

10. The electrode of claim 1, wherein the active material layer further comprises a conductive agent.

11. The electrode of claim 10, wherein the conductive agent is selected from the group consisting of nickel powder, cobalt oxide, titanium oxide, carbon, and combinations thereof.

12. The electrode of claim 10, wherein the conductive agent comprises carbon selected from the group consisting of ketjen black, acetylene black, furnace black, denka black, graphite, carbon fiber, fullerene, and combinations thereof.

13. A rechargeable lithium battery comprising
a negative electrode comprising a current collector coated with an active material layer comprising negative active material and an esterified cellulose-based polymer binder having an esterification degree of greater than or equal to 1.3 and a molecular weight of greater than or equal to 100,000.

14. The rechargeable lithium battery of claim 13, wherein the esterified cellulose-based polymer binder is provided in an amount less than or equal to 2% by weight based on the total amount of the active material layer.

15. The rechargeable lithium battery of claim 13, wherein the esterification degree of the esterified cellulose-based polymer binder is between 1.5 and 3.0.

16. The rechargeable lithium battery of claim 13, wherein the molecular weight of the estenfied cellulose-based polymer binder is between 100,000 and 300,000.

17. The rechargeable lithium battery of claim 13, wherein the negative active material is selected from the group consisting of materials capable of reversible intercalation/deintercalation of lithium ions, metals capable of alloying with lithium, and combinations thereof.

18. The rechargeable lithium battery of claim 17, wherein the negative active material comprises a material capable of reversible intercalation/deintercalation of lithium ions selected from the group consisting of artificial graphite, natural graphite, graphitized carbon fiber, graphitized mesocarbon microbeads, fullerene, amorphous carbon, and combinations thereof.

19. The rechargeable lithium battery of claim 17, wherein the negative active material comprises a metal capable of alloying with lithium selected from the group consisting of Al, Si, Sn, Pb, Zn, Bi, In, Mg, Ga, Cd, Ge and combinations thereof.

20. The rechargeable lithium battery of claim 13, wherein the current collector is selected from the group consisting of punching metals, exmet punching metals, metal foils, foamed metals, and mesh metal-fiber calcinated bodies.

21. The rechargeable lithium battery of claim 13, wherein the active material layer further comprises a conductive agent.

22. The rechargeable lithium battery of claim 21, wherein the conductive agent is selected from the group consisting of nickel powder, cobalt oxide, titanium oxide, carbon, and combinations thereof.

23. The rechargeable lithium battery of claim 22, wherein the conductive agent comprises carbon selected from the group consisting of ketjen black, acetylene black, furnace black, denka black, graphite, carbon fiber, fullerene, and combinations thereof.

* * * * *

UNITED STATES PATENT AND TRADEMARK OFFICE
CERTIFICATE OF CORRECTION

PATENT NO. : 7,267,907 B2  Page 1 of 1
APPLICATION NO. : 10/996938
DATED : September 11, 2007
INVENTOR(S) : Kim It is certified that error appears in the above-identified patent and that said Letters Patent is hereby corrected as shown below:

In the Claims

Column 7, line 18, Claim 5    Delete "estenfied",
                              Insert --esterified--

Column 8, line 13, Claim 16   Delete "estenfied",
                              Insert --esterified--

Signed and Sealed this

Sixth Day of May, 2008

JON W. DUDAS
*Director of the United States Patent and Trademark Office*